United States Patent [19]

Irvine et al.

[11] 4,252,565
[45] Feb. 24, 1981

[54] STABILIZED PHTHALOCYANINES

[75] Inventors: Alexander M. Irvine, Dean Park; Robert Langley, Glasgow; Christopher J. Bridge, Dalry, all of Scotland

[73] Assignee: Ciba-Geigy Corporation, Ardsley, N.Y.

[21] Appl. No.: 91,614

[22] Filed: Nov. 5, 1979

Related U.S. Application Data

[63] Continuation of Ser. No. 964,755, Nov. 29, 1978, abandoned, which is a continuation of Ser. No. 783,526, Apr. 1, 1977, abandoned.

[30] Foreign Application Priority Data

Apr. 8, 1976 [CH] Switzerland .................. 14270/76

[51] Int. Cl.$^3$ .................. C09D 11/02; C09D 11/08
[52] U.S. Cl. .................. 106/20; 106/23; 106/26; 106/27; 106/30; 106/193 P; 106/241; 106/288 Q; 260/42.21; 260/314.5
[58] Field of Search .................. 106/20–23, 106/26, 27, 28–32, 288 Q; 260/314.5

[56] References Cited

U.S. PATENT DOCUMENTS

| | | | |
|---|---|---|---|
| 3,041,192 | 6/1962 | Brouillard et al. | 106/308 Q |
| 3,775,149 | 11/1973 | Langley et al. | 106/308 Q |
| 3,917,639 | 11/1975 | Paget et al. | 260/314.5 |
| 4,013,481 | 3/1977 | Molls et al. | 106/309 |

FOREIGN PATENT DOCUMENTS 803088 1/1974 Belgium .
1343606 1/1974 United Kingdom .

Primary Examiner—Lorenzo B. Hayes
Attorney, Agent, or Firm—Harry Falber

[57] ABSTRACT

A copper phthalocyanine derivative having the formula:

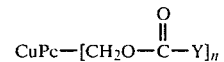

or a mixture thereof wherein CuPc represents the residue of a copper phthalocyanine molecule, Y is an alkyl or alkenyl residue each having from 8 to 22 carbon atoms, and each being unsubstituted or substituted by one or more hydroxy groups or being interrupted by one or more nitrogen atoms, or Y is an alkoxyaryl- or aralkyloxyaryl, or an alkyl-aralkyloxyaryl residue wherein the alkoxy-, aralkyloxy- or alkyl-aralkyloxy moiety contains from 7 to 22 carbon atoms, and n is an integer from 1 to 8, provides, when incorporated into a phthalocyanine pigment, a phthalocyanine pigment composition having excellent flocculation resistance, when incorporated into paint and printing media, which moreover exhibit improved flow.

11 Claims, No Drawings

STABILIZED PHTHALOCYANINES

This is a continuation of application Ser. No. 964,755 filed on Nov. 29, 1978, which is a continuation of application Ser. No. 783,526, filed on Apr. 1, 1977, both now abandoned.

The present invention relates to stabilised phthalocyanines.

Phthalocyanine pigments, especially copper phthalocyanines, by virtue of their low cost, high strength, brilliant shades and outstanding general fastness properties are of great commercial significance.

In paint and lacquer systems however, phthalocyanine pigments tend to suffer from a defect, namely flocculation. The defect manifests itself especially in non-aqueous systems. If paints containing flocculating phthalocyanine pigments are applied under different conditions of shear, widely different colour strengths can be obtained. Similarly, when paints or printing inks containing flocculating phthalocyanine pigments are stored, the pigment particles tend to aggregate with resulting loss of tinctorial strength and homogeneity of the paint or ink.

We have now found copper phthalocyanine derivatives which, when incorporated into a phthalocyanine pigment, provide a phthalocyanine pigment composition having excellent flocculation resistance, when incorporated into print and printing ink media; moreover, the pigmented media exhibit improved flow and other desirable pigmentary properties.

Accordingly, the present invention provides a copper phthalocyanine derivative having the formula:

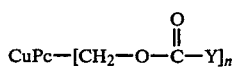

or a mixture thereof wherein CuPc represents the residue of a copper phthalocyanine molecule, Y is an alkyl or alkenyl residue each having from 8 to 22 carbon atoms, and each being unsubstituted or substituted by one or more hydroxy groups or being interrupted by one or more nitrogen atoms, or Y is an alkoxyaryl- or aralkyloxyaryl, or an alkyl-aralkyloxyaryl residue wherein the alkoxy-, aralkyloxy or alkyl-aralkyloxy moiety contains from 7 to 22 carbon atoms, and n is an integer from 1 to 8.

Preferably n is 2, 3 or 4.

Alkyl residues Y are derived from saturated acids Y-COOH, and these acids preferably contain from 12 to 18 carbon atoms and especially from 14 to 16 carbon atoms. Examples of suitable saturated acids Y-COOH are n-octanoic, iso-octanoic, n-decanoic, n-dodecanoic(lauric), n-tetradecanoic (myristic), n-hexadecanoic (palmitic), n-octadecanoic (stearic), 12-hydroxystearic, n-cisozanoic and n-docosanoic (behenic) acids. In view of their superior anti-flocculation properties residues Y derived from n-tetradecanoic and n-hexadecanoic acids are preferred.

When Y is an alkenyl residue, it is derived from an unsaturated acid Y-COOH which preferably contains from 12 to 18 carbon atoms. Suitable examples of unsaturated acids Y-COOH include n-octenoic, n-decenoic, n-dodecenoic and oleic acids as well as ethylenically unsaturated, commercially available polycyclic acids such as rosin and hydrogenated, rosins, Examples of alkoxyaryl, aralkyloxy- or alkyl-aralkyloxy-aryl residues Y are those having the formula:

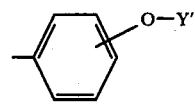

wherein $Y^1$ is an alkyl residue containing from 6 to 22 carbon atoms or an optionally alkyl-substituted aralkyl residue. Examples of suitable and preferred alkyl residues $Y^1$ are the same as those listed hereinbefore in respect of Y. When $Y^1$ is an optionally alkyl-substituted aralkyl residue, it may be e.g. a benzyl, methyl-, ethyl-, propyl-, butyl-, hexyl-, octyl-, decyl-, dodecyl- or tetradecylbenzyl residue. Specific preferred example of alkoxy, aralgyloxy- or alkyl-aralkyloxy residues $OY^1$ are hexyloxy, octyloxy, cotyloxy, benzyloxy and p-dodecylbenzyloxy residues.

The present invention also provide a process of producing the compounds of formula I comprising reacting a chloromethylated copper phthalocyanine of formula:

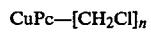

wherein CuPc and n have their previous significance, with an alkali metal salt of an acid having the formula:

wherein Y has its previous significance and M is an alkali metal, preferably sodium.

The process of the invention may be conveniently effected by conducting the reaction in an organic solvent e.g. xylene or toluene inert under the reaction conditions, and optionally in the presence of a catalyst such as cetyltrimethyl ammonium bromide. The reaction mixture may be worked up in conventional manner e.g. by removing the solvent by steam distillation, filtering the compound of formula I and drying it.

The starting-materials of formula III and IV are known compounds.

As already premised, the compounds of formula I have value as flocculation stabilisers for phthalocyanine pigments, and the flocculation-stabilised pigment compositions so produced impart improved flow properties into surface coating media containing said pigment compositions.

Accordingly, the present invention further provides a pigment composition comprising a phthalocyanine pigment susceptible to flocculation and 2–25, especially 5–15% by weight, based on the weight of the flocculating phthalocyanine, of a compound of formula I as hereinbefore defined.

The present invention still further provides a composition comprising an organic material and a pigmenting proportion of a pigment composition according to this invention.

The phthalocyanine pigment susceptible to flocculation may be a metal-free or a metal-containing phthalocyanine pigment. Of these, the latter class is more important for use in this invention, particularly those containing cobalt, nickel or, especially, a copper atom.

Pigment compositions according to this invention may be produced by a variety of methods. Preferably, however, the compound of formula I may be incorporated into the flocculating phthalocyanine during the conversion of the latter from its crude state into its pigmentary form or, if the phthalocyanine is being prepared directly in pigmentary form, during the synthesis of the pigment. Alternatively, the pigmentary flocculating phthalocyanine and the compound of formula I may be physically blended together before, during or after incorporation of the pigments into an application medium e.g. a surface coating medium.

The pigment compositions of this invention can also contain natural resins such as abietic acid or esters thereof, ethyl cellulose acetobutyrate, alkaline earth metal salts of higher fatty acids, fatty amines such as stearylamine or rosinamine, vinyl chloride/vinyl acetate copolymers, polyacrylenitrile or polyterpene resins.

Organic materials suitable for colouration by the pigment compositions of the present invention include natural or synthetic polymers or copolymers, coating compositions for application to the surface of an article and printing ink media. Preferred organic materials are paints, lacquers and other surface coating compositions, or tinting compositions for use in such coating compositions and printing inks.

Pigment compositions of the invention containing compounds of formula I have excellent flocculation resistance when incorporated into paint and printing ink media particularly gravure printing ink and paint media whereby the flow properties of these media are considerably improved.

The following Examples further illustrate the present invention. Parts and percentages shown therein are by weight.

EXAMPLE 1

84.5 parts of sodium stearate were heated in 1000 parts of xylene to give a thick paste which was allowed to cool to room temperature before the addition of 44.6 parts of chloromethylated copper phthalocyanine (chlorine content 19.9%). After the mixture had been stirred for 1 hour, 10 parts of GLOQUAT C (a commercially available quaternary ammonium salt) were added, followed by 250 parts of xylene. The reaction was heated to 120° C., stirred for 5 hours at 120° C. and then allowed to cool with stirring. 12 parts of 50% aqueous acetic acid were added, followed by 1000 parts of water and the xylene was azeotroped off by distillation, water being added as necessary. The solids were filtered off, reslurried in ethanol, filtered and dried, giving 71.5 parts of a blue solid having a chlorine content of 2.8%.

EXAMPLE 2

42.5 parts of behenic acid were refluxed in 390 parts of xylene with 5 parts of sodium hydroxide dissolved in 25 parts of water, the water being distilled off leaving a suspension of the sodium salt of behenic acid in xylene. This was allowed to cool to room temperature before the addition of 2.5 parts of cetyl trimethyl ammonium bromide and 24.7 parts of chloromethylated copper phathalocyanine (chlorine content 17.95%). The mixture was heated with stirring at 110°-120° C. for 8 hours, cooled, the xylene azeotroped off with water, the solids filtered off, washed with water followed by methanol and dried giving 57.5 parts of blue solid, having a chlorine content of 1.5%.

EXAMPLE 3

40 parts of lauric acid, 8 parts of sodium hydroxide dissolved in 25 parts of water, 350 parts of methyl isobutyl ketone and 150 parts of toluene were refluxed with stirring until no more water was being boiled off from the reaction. The mixture was then allowed to cool to room temperature before the addition of 3.6 parts of cetyl trimethyl ammonium bromide and 30 parts of chloromethylated copper phthalocyanine (chlorine content 17.9%). The reaction mixture was refluxed for 8 hours. After cooling 12 parts of 50% aqueous acetic acid were added followed by 500 parts of water and the solvent was azeotroped off. The solid was filtered off, slurried in ethanol, filtered, washed with water and dried, giving 38.2 parts of blue solid (chlorine content 5.6%).

EXAMPLE 4

By replacing the lauric acid in Example 3 with 45.6 parts of myristic acid, a similar product can be obtained, with a yield of 43.3 parts, and a chlorine content of 1.1%.

EXAMPLE 5

By replacing the lauric acid of Example 3 with 51.2 parts of palmitic acid, a yield of 49.7 parts of a product having a chlorine content of 0.7% can be obtained.

EXAMPLE 6

By replacing the lauric acid in Example 3 with 56.8 parts of steric acid, a yield of 55.1 parts of a blue solid having a chlorine content of nil can be obtained.

EXAMPLE 7

36.7 parts of oleic acid, 5.5 parts of sodium hydroxide dissolved in 20 parts of water, and 500 parts of xylene were refluxed until no more water was being boiled off from the reaction. After cooling 2.5 parts of cetyl trimethyl ammonium bromide and 22.3 parts of chloromethylated copper phthalocyanine (chlorine content 19.9%) were added and the reaction heated at 120°-130° C. for 10 hours. After cooling 500 parts of water were added followed by 15 parts of 50% acetic acid and the xylene azeotroped off. The solids were filtered off, slurried in ethanol, filtered, washed with water and dried, giving a blue solid (chlorine content 1.8%).

EXAMPLE 8

18.4 parts of undecylenic acid, 4 parts of sodium hydroxide dissolved in 25 parts of water and 300 parts of xylene were heated at 110°-120° C. until no more water was being boiled off from the reaction. After cooling to room temperature 1 part of cetyl trimethyl ammonium bromide and 19.8 parts of chloromethylated copper phthalocyanine (chlorine content 17.95%) were added and the mixture heated to 110°-120° C. with stirring for 8 hours. The reaction was cooled to 50° C. before the addition of 500 parts of water and the xylene was azeotroped off. The solids were filtered off, washed with water, slurried in 500 parts of warm methanol, filtered, washed with water and dried, giving 24.8 parts of a blue solid having a chlorine content of 4.5%.

EXAMPLE 9

45.1 parts of stayhelite resin (a commercially prepared partially hydrogenated wood rosin with a carboxylic acid group on the molecule), 7.8 parts of potassium hydroxide dissolved in 20 parts of water and 750 parts of toluene were refluxed until no more water was being boiled off from the reaction. After the mixture had cooled to room temperature 2.5 parts of cetyl trimethyl ammonium bromide and 22.3 parts of chloromethylated copper phthalocyanine (chlorine content 19.9%) were added and heating continued at 100°–110° C. for 10 hours. After cooling to room temperature 500 parts of water were added and the solvent azeotroped off. The solid was filtered off, washed with water, stirred in ethanol, filtered, washed with water and dried, giving a blue solid having a chlorine content of 1.5%.

EXAMPLE 10

14.4 parts of n-octanoic acid, 4 parts of sodium hydroxide dissolved in 25 parts of water and 500 parts of toluene were refluxed until no more water was being boiled off from the reaction. 3 parts of cetyl-trimethyl ammonium bromide and 21.1 parts of chloromethylated copper phthalocyanine (chlorine content 19.6%) were then added and the mixture refluxed for 16 hours. After cooling from the boil, 500 parts of water were then added and the toluene azeotroped off. The slurry was drowned into 2000 parts of methanol, stirred, filtered and the solid washed with water and dried, giving a blue solid having a chlorine content of 3.2%.

EXAMPLE 11

By replacing the n-octanoic acid of Example 10 by 17.9 parts of n-decanoic acid a similar product is obtained, having a chlorine content of 2.9%.

EXAMPLE 12

37.2 parts of 12-hydroxy-stearic acid and 5 parts of sodium hydroxide dissolved in 25 parts of water were refluxed in 500 parts of toluene for 6 hours to remove all water from the reaction. 26.4 parts of chloromethylated copper phthalocyanine (of chlorine content 17.3%) were added together with 2.5 parts of cetyl trimethyl ammonium bromide and the reactants were refluxed for 8 hours. 500 parts of water were added and the toluene azeotroped off. The blue solid was washed with methanol, followed by water and dried, to give a product having a chlorine content of 7.4%.

EXAMPLE 13

24.7 parts of chloromethylated copper phthalocyanine, 83.2 parts of a 50% solution of 3-dodecylamino-n-butanoic acid as its sodium salt (commercially known as Armeen SZ), and 2.5 parts of cetyl trimethyl ammonium bromide were refluxed in 300 parts of xylene to remove all of the water and then refluxed for a further 4 hours. The xylene was then azeotroped off with water and the blue product washed with methanol and water.

EXAMPLE 14

128 parts of crude copper phthalocyanine were ground with 248 parts of anhydrous sodium sulphate, 20 parts of anhydrous sodium acetate and 4 parts of diethylaniline to give a salt/pigment mixture in which approximately 65% of the copper phthalocyanine was in the alpha form, the remainder being in the beta form. The salt/pigment mixture was refluxed for 5 hours in 1100 parts of isopropanol/water azeotrope. The slurry was then cooled to 60° C. and 13.2 parts of the product of Example 6 were added, followed by 20 parts of diethylaniline. The slurry was then stirred for 15 minutes before the addition of 1500 parts of water followed by 120 parts of 5 N hydrochloric acid. The isopropanol/water azeotrope was distilled off and the pigment filtered, washed with water and dried, giving a blue phthalocyanine pigment in the beta form.

EXAMPLE 15

By replacing the 13.2 parts of the product of Example 6 with 13.2 parts of the product of Example 7 in the procedure of Example 14 a similar product can be obtained.

By using the process of Example 14 and replacing the product of Example 6 by an equivalent amount of any of the products of Examples 1–5, 8–11 and 13, samples of pigment may be obtained which, like the products of Examples 14 and 15 are suitable for use in gravure ink and decorative paint coating systems wherein they exhibit superior flow and flocculation resistance when compared with phthalocyanine pigments prepared in a similar manner but without the addition of the respective composition of the invention.

EXAMPLE 16

45.25 parts of p-cetyloxybenzoic acid were refluxed in 500 parts by volume of toluene with 5 parts of sodium hydroxide dissolved in 25 parts by volume of water, until no more water was being boiled off from the reaction. 24.7 parts of chloromethylated phthalocyanine (of chlorine content 17.3%) were then added and the reaction refluxed for 8 hours. 500 parts by volume of water were added and the toluene distilled off. The product was filtered off, washed with methanol, followed by water, and dried in the oven at 50° C., giving 55.8 parts of a blue solid having a chlorine content of 0.24%.

EXAMPLE 17

500 parts of a mixture containing 160 parts of crude copper phthalocyanine, 25 parts of anhydrous sodium acetate, and 310 parts of anhydrous sodium sulphate, which had been ground in the presence of diethylaniline so that the mixture contained 70% of the copper phthalocyanine in the alpha form (the remainder being in the beta form) were refluxed with stirring for 5 hours in 1650 parts by volume of isopropanol/water azeotrope. 15.8 parts of the product of Example 16 were added with 25 parts by volume of diethylaniline. After 15 minutes 1900 parts by volume of water were added and the isopropanol/water azeotrope distilled off. The slurry was then allowed to cool to 60° C. before the addition of 150 parts of 6 N hydrochloric acid. After a further 30 mins. stirring at 60° C. the solid product was filtered off, washed free of sulphate ions with water, and dried at 60° C., giving a blue phthalocyanine pigment in the beta form.

EXAMPLE 18

29.0 parts of 4(p-dodecylbenzyloxy)-benzoic acid, and 3 parts sodium hydroxide dissolved in approximately 20 parts of water, were refluxed in 250 parts xylene until all the water had been azeotroped off. After cooling 15.5 parts of chloromethylated copper phthalocyanine (of chlorine content 12.8%) were added and the reaction refluxed for 16 hours. Water was then added and the xylene was azeotroped off. The blue solid was filtered off, washed with alcohol, followed by water and dried. The product had a chlorine content of 1.6%.

EXAMPLE 19

11.4 parts of p-benzyloxybenzoic acid and 2 parts of sodium hydroxide, dissolved in 100 parts of water, were refluxed in 250 parts of xylene until all the water had been azeotroped off. 1 part of cetyl-trimethyl ammonium bromide and 10.15 parts of chloromethylated copper phthalocyanine (of chlorine content 20.4%) were added and the reaction mixture refluxed for 8 hours. After cooling 250 parts of water were added and some of the xylene azeotroped off. The remainder was removed, during filtration and isolation of the blue solid, by washing with methanol. The solid had a chlorine content of 4.15%.

EXAMPLE 20

By replacing the benzyloxybenzoic acid of Example 19 with 12.5 parts of p-octyloxy benzoic acid a similar product was obtained. The product had a chlorine content of 3.2%.

EXAMPLE 21

By replacing the benzyloxybenzoic acid of Example 19 with 12.1 parts of hexyloxybenzoic acid a similar product was obtained. The product had a chlorine content of 2.1%.

By using the process of Example 14 and replacing the product of Example 6 by an equivalent amount of any of the products of Examples 16–21, samples of pigment may be obtained which are suitable for use in gravure ink and industrial paint coating systems wherein they exhibit superior flow and flocculation resistance when compared with phthalocyanine pigments prepared in a similar manner but without the addition of the respective pigment composition of the invention.

EXAMPLE 22

37.2 parts of cuprous chloride and 5.4 parts of dimethylglyoxime were added in 900 parts of dry methanol and the mixture stirred at room temperature until a dark brown complex had formed. 192 parts of 95% pure phthalodinitrile, 18 parts of ammonium chloride and 6 parts of 1,2,4-trichloro-3-phenoxy copper phthalocyanine were added and stirring continued at room temperature for 1 hour. 17.4 parts of sodium metal and 6 parts of pyridine, dissolved in 60 parts of dry methanol, are added simultaneously over 1 hour. After a further 1 hour stir at room temperature the mixture was refluxed for 8 hours, cooled to room temperature and treated with 144 parts of 98% sulphuric acid for one hour at room temperature followed by 1 hour at reflux. The suspension was then neutralised with aqueous sodium hydroxide, stirred for 30 minutes and then treated with 11 parts of the product of Example 16 dissolved or well dispersed in diethylaniline. Stirring at room temperature was continued for 1 hour followed by the addition of dilute hydrochloric acid to adjust the slurry to pH4. After 15 minutes stirring the product was filtered off, washed with methanol and cold dilute hydrochloric acid, and finally with water before being dried at 50°–60° C. to give a blue solid which gives a red-shade blue coating in an industrial alkyd-melamine-formaldehyde paint application and which gives improved flow and flocculation resistance when compared with the product obtained when the product of Example 16 is omitted from the process of Example 22.

What we claim is:

1. A copper phthalocyanine derivative of the formula

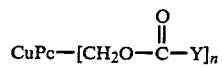

or mixture thereof wherein CuPc represents a copper phthalocyanine, Y is selected from the group consisting of alkyl of 8 to 22 C atoms, alkenyl of 8 to 22 C atoms, hydroxyalkyl of 8 to 22 C atoms, hydroxyalkenyl of 8 to 22 C atoms, alkoxyaryl in which the alkoxy has 7 to 22 C atoms, aralkyloxyaryl in which the aralkloxy has 7 to 22 C atoms and alkyl-aralkyloxy-aryl in which the alkyl-aralkyloxy has 7 to 22 C atoms, and n is an integer from 1 to 8.

2. A derivative as claimed in claim 1 wherein n is 2, 3, or 4.

3. A derivative as claimed in claim 2 wherein Y is alkyl containing from 11 to 17 carbon atoms.

4. A derivative as claimed in claim 3 wherein Y is alkyl containing from 13 to 15 carbon atoms.

5. A derivative as claimed in claim 4 wherein Y is the alkyl radical of n-tetradecanoic or n-hexadecanoic acid.

6. A derivative as claimed in claim 1 wherein Y is alkenyl containing from 11 to 17 carbon atoms.

7. A derivative as claimed in claim 1 wherein Y is of the formula:

wherein Y' is alkyl containing from 7 to 22 carbon atoms or benzyl.

8. A flocculation resistant pigment composition comprising a phthalocyanine pigment and 2 to 25% by weight, based upon said phthalocyanine pigment, of a copper phthalocyanine derivative having the formula

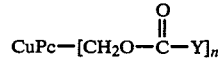

or a mixture thereof wherein CuPc represents a copper phthalocyanine, Y is selected from the group consisting of alkyl of 8 to 22 C atoms, alkenyl of 8 to 22 C atoms, hydroxyalkyl of 8 to 22 C atoms, hydroxyalkenyl of 8 to 22 C atoms, alkoxyaryl in which the alkoxy has 7 to 22 C atoms, aralkyloxyaryl in which the aralkyloxy has 7 to 22 C atoms and alkyl-aralkyloxyaryl in which the alkyl-aralkyloxy has 7 to 22 C atoms, and n is an integer from 1 to 8.

9. A flocculation stabilized pigment composition according to claim 8 containing 5 to 15% of the copper phthalocyanine derivative, based upon said phthalocyanine pigment.

10. A pigment composition as claimed in claim 9 wherein the phthalocyanine is a copper phthalocyanine.

11. In a printing ink or coating composition containing, as the vehicle, a film-forming natural or synthetic polymer or copolymer and a pigment, the improvement comprising, as said pigment, the flocculation stabilized pigment composition according to claim 8.

* * * * *